Patented Sept. 7, 1954

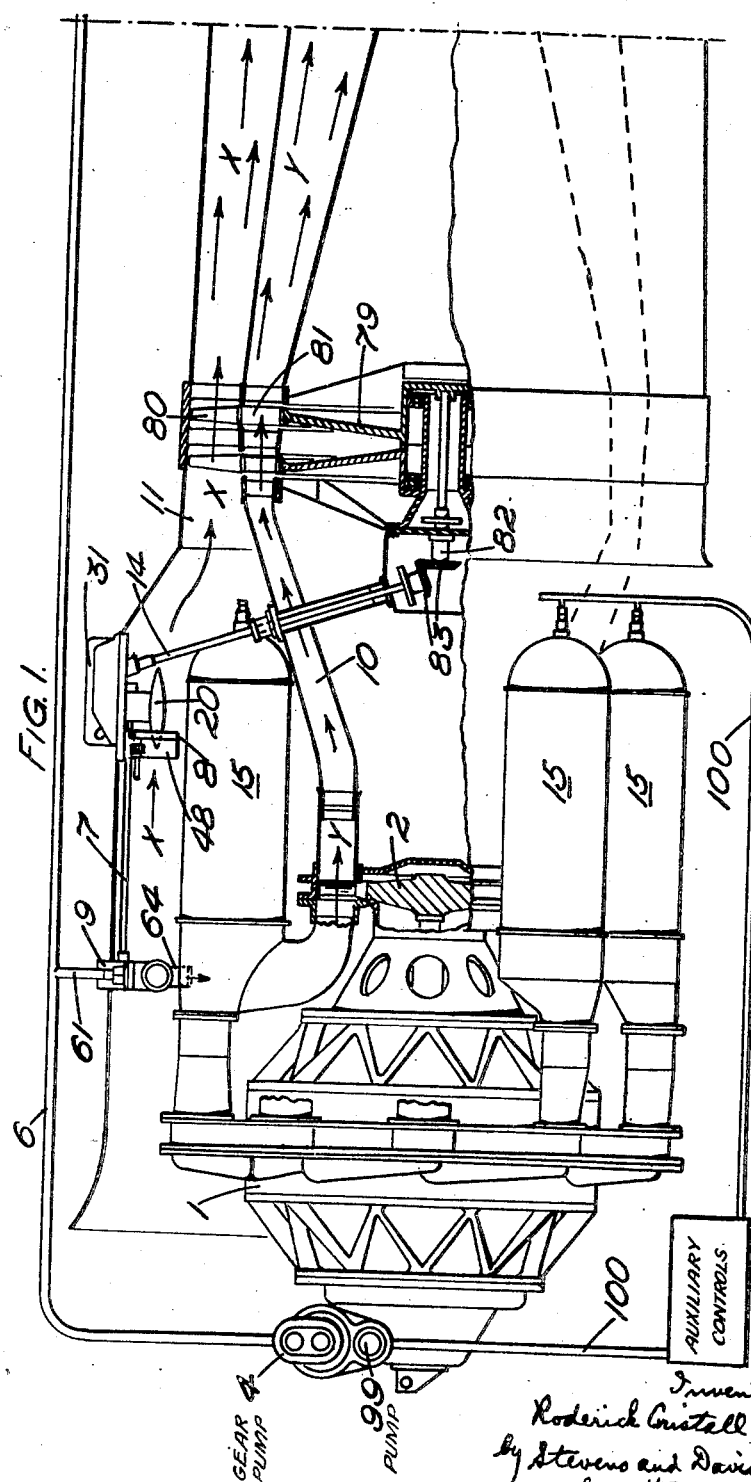

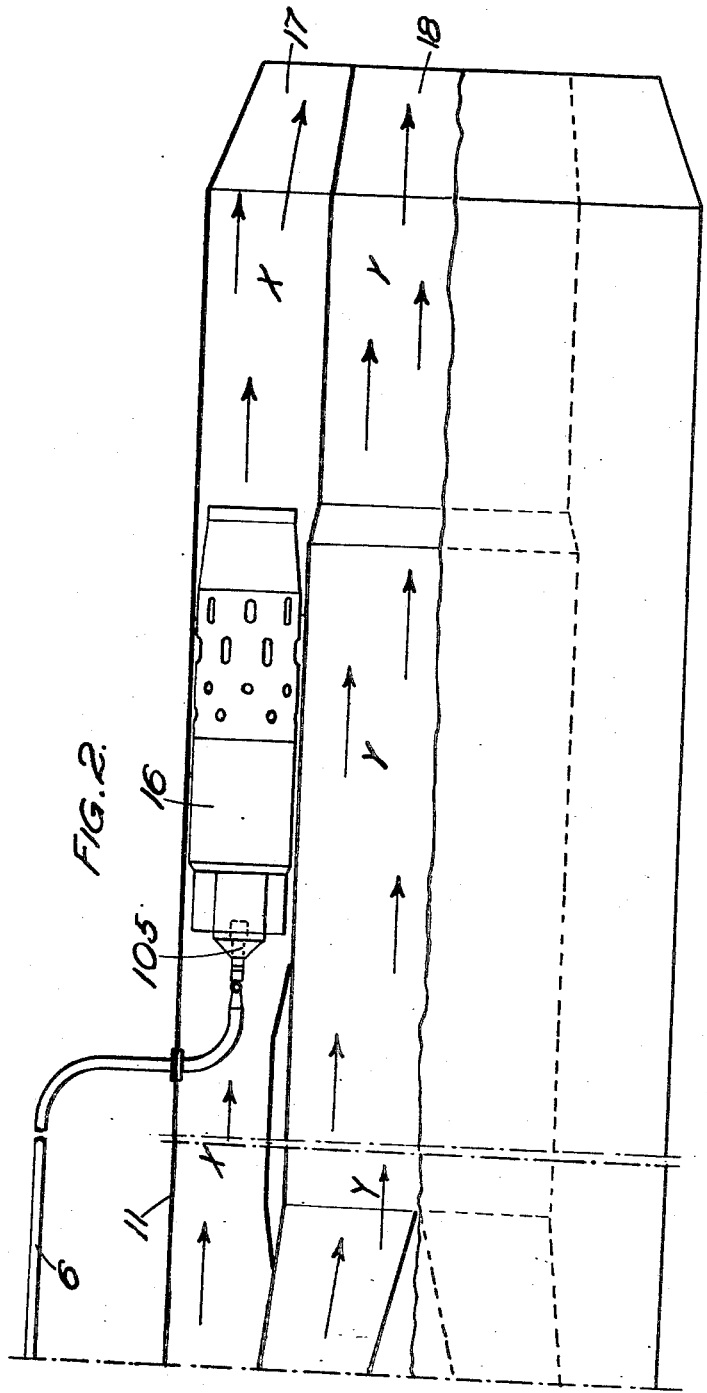

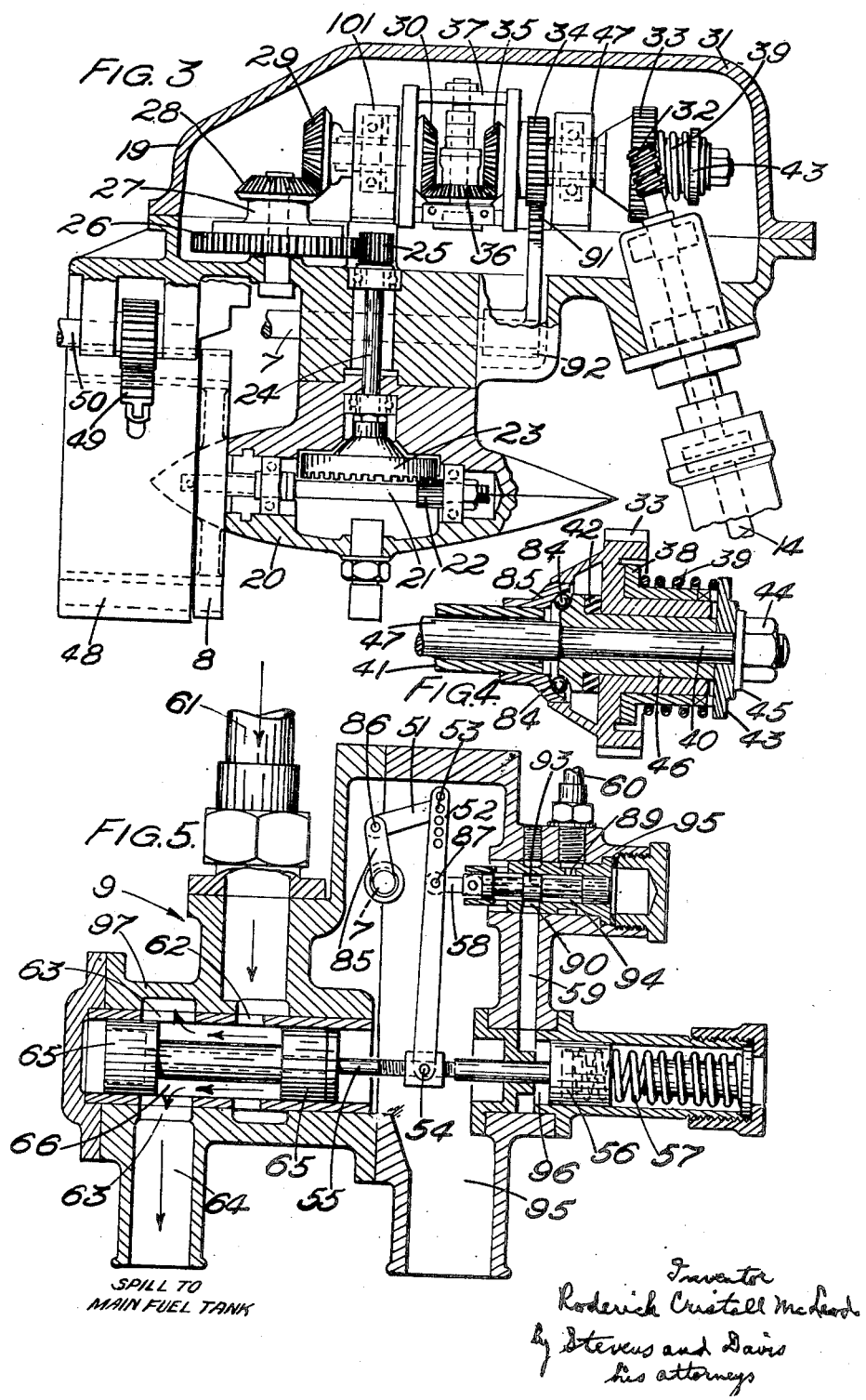

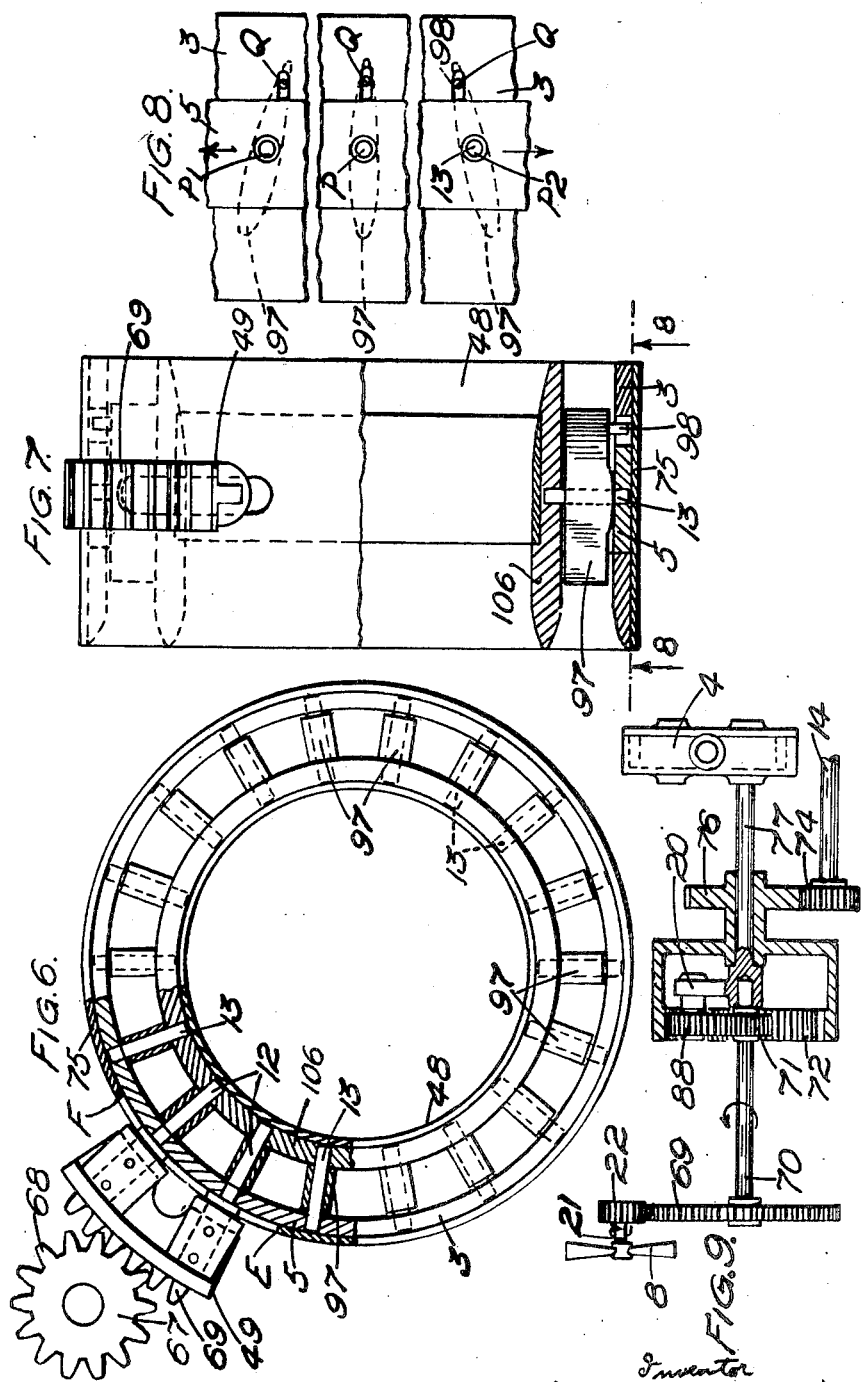

2,688,745

UNITED STATES PATENT OFFICE 2,688,745

FUEL CONTROL FOR GAS TURBINE THRUST AUGMENTORS

Roderick Cristall McLeod, Cropston, England, assignor to Power Jets (Research and Development) Limited, London, England, a British company Continuation of application Serial No. 627,465, November 8, 1945. This application September 8, 1950, Serial No. 183,843

11 Claims. (Cl. 60—35.6)

The application of which this specification forms part is a continuation of my co-pending application Serial No. 627,465 filed November 8, 1945, now abandoned, and relates to propulsive systems for aircraft, and more particularly to systems comprising the principle of jet propulsion in which there is provision for thrust augmentation by some means secondary to and dependent on a prime mover, involving the burning of fuel in the gaseous atmosphere forming the exhaust from the prime mover, or in an airflow promoted by an airscrew, blower, injector, or the equivalent which is energised by the prime mover.

Such a propulsion system may for example comprise a compressor driven by a gas turbine, and combustion arrangements which burn fuel (called primary fuel) in the compressor output, the so-energised air and gases driving the turbine and forming the main propulsive jet stream. The augmenter consists of a further gas turbine driven by this stream and in turn driving a further compressor or ducted fan which entrains new (secondary) air, which is expelled along with the main jet stream and augments the total thrust.

Downstream from the augmenter in the secondary air, secondary fuel is to be burned still further to augment the thrust by raising the velocity of discharge. Such secondary fuel supply may only be used when bursts of particularly high thrust are required, either at ground level (e. g. for take-off) or at altitude for operational reasons. It can be apprehended that the control of the secondary fuel should be as simple as possible, the pilot merely turning it on or off, and other automatic means regulating it in accordance with the conditions operating at the time. In this way the whole system may remain under the control of the simple throttle valve which controls the running of the prime mover.

With the above mentioned objects in view, the invention consists in controlling the supply of secondary fuel by the provision of a control valve or equivalent (such as control of a variable delivery pump) operated by differential means susceptible to two transmitting systems, of which one responds to the velocity of the air stream (or a factor related to such velocity such as relative direction of flow) whilst the other responds to the rotational speed of the rotary means creating the air stream.

By way of example, two forms of embodiment of the invention are described hereinunder with reference to the accompanying drawings in which:

Fig. 1 is a general diagrammatic view of a propulsion system having the invention applied thereto;

Fig. 2 is a continuation of Fig. 1;

Fig. 3 is an enlarged vertical section of a differential mechanism forming part of a first form of embodiment of the invention;

Fig. 4 is an enlarged view of a detail of Fig. 3;

Fig. 5 is a section on a further enlarged scale of a valve system forming another part of the said first form of embodiment;

Fig. 6 is a sectional end view of an apparatus for varying the angle of stator blades;

Fig. 7 is a front elevation of said apparatus;

Fig. 8 is a section on the line 8—8 of Fig. 7;

Fig. 9 is a diagrammatic view of a second form of embodiment.

Referring to the drawings, Figs. 1 and 2 show an example of the general arrangement of a propulsion system for aircraft of the particular type which has given rise to the invention. This system comprises a compressor 1 driven by a gas turbine 2 mounted co-axially on the same shaft, the air being brought to combustion together with fuel in the compressor output which is delivered to the combustion chambers 15 in which combustion takes place. The hot gases are led through the turbine 2 thus driving it, then pass through an annular duct 10 in the direction of the arrows Y and are finally emitted through an outlet 18 forming in this way a main propulsive jet stream. The main fuel required is supplied from a main tank (not shown) and is delivered by means of a pump 99 through piping 100 supplied with auxiliary controls (indicated diagrammatically) not relevant to or described in this specification.

The propulsive system further comprises an augmenter system 79 comprising a further gas turbine element 81 which in turn drives a further compressor or ducted fan 80 which entrains new or secondary air through an annular duct 11. This air passes along the duct 11 in the direction of the arrows X and finally emerges from the apparatus at the outlet 17 being expelled together with the main jet stream from the outlet 18 and thus augmenting the total thrust produced.

Downstream from the augmenter 79 in the secondary air, secondary fuel is burned in a number of flame tubes 16 arranged in the annular duct 11 to augment the thrust by raising the velocity of discharge, fuel being led into the flame tube 16 by means of a burner 105, the design, in this particular case, being on the basis that secondary fuel will normally be burnt continuously.

The supply for the secondary fuel is delivered from a main fuel tank (not shown) by means of a gear pump 4 through piping 6 to the burner 105. A branch pipe 61 leads from the fuel pipe 6 to a valve system indicated generally by reference numeral 9 and forming part of the apparatus according to one form of embodiment of the invention.

The valve system 9 (which is shown in detail in Fig. 5 and described more fully hereinunder) comprises a spill 64 through which spilled fuel is led back to the main fuel tank, the amount of fuel fed to the burner 105 thus being reduced by the amount of fuel spilled back.

A windmill 8 of fixed pitch is mounted so as to run in the secondary air stream X and is thus sensitive to its velocity and direction of flow. This windmill 8 is a very coarsely pitched airscrew having virtually no slip when running lightly loaded, and located immediately upstream of said windmill is an apparatus indicated generally by reference numeral 48 (shown in detail in Figs. 6-8) the object of which is to vary the angle of attack of the secondary air stream on the blades of the windmill 8 by varying the angle of stator blades or guide vanes immediately upstream of said windmill.

The valve system 9 is connected by means of a shaft 7 to a differential gear mechanism indicated generally by reference numeral 31 which forms another part of said form of embodiment of the invention, and is shown in detail in Figs. 3 and 4. The differential mechanism 31 (which will be more fully described hereinunder) comprises essentially a conventional form of bevel differential gearing 30, 35, 36, 37 (in Fig. 3) of which one input shaft (47, Fig. 3) is coupled through shaft 14 and gearing 82—83 (Fig. 1) to the augmenter 79 while the other input shaft (101, Fig. 3) is linked to the windmill 8.

The differential sum of the two input torques is transmitted from the differential gear mechanism 31 by means of shaft 7 to the valve system 9, consequently varying the amount of fuel spilled back through spill 64 in a manner which is more fully described hereinunder and which is related to the speed of rotation of the windmill 8 and the augmenter 79.

The differential gear mechanism 31 is shown in detail in Figs. 3 and 4, and comprises essentially a conventional form of bevel differential gearing 30, 35, 36, 37 having two input shafts 47 and 101 of which shaft 47 is coupled to shaft 14 which leads to the augmenter 79 while shaft 101 is coupled through suitable gearing to the windmill 8 so as to give the windmill shaft as nearly zero slip as possible.

The windmill 8 is mounted on a shaft 21 supported in a stream-lined body 20. The shaft 21 is provided at one end with a pinion 22 which meshes with a crown wheel 23 on shaft 24 having a pinion 25 which meshes with a gear wheel 26 on shaft 27. The said shaft 27 is provided with a bevel gear wheel 28 co-operating with a bevel gear wheel 29 on shaft 101 on which is mounted a bevel gear wheel 30 which thus rotates at a speed which varies according to the speed and direction of rotation of the windmill 8, and constitutes one input torque of the differential gear mechanism 31. A shaft 14 coupled to the augmenter 79 through gearing 82, 83 (Fig. 1) is led to the other input shaft 47 through a spiral pinion 32 to a spiral wheel 33 and through a friction clutch (shown enlarged in Fig. 4) to shaft 47 on which is mounted a bevel gear wheel 35 which thus rotates at a speed which varies with the speed of rotation of the augmenter 79.

The bevel gears 30 and 35 both mesh with bevel gear 36 and the cage 37 of the differential gear mechanism 31 is coupled to a gear wheel 34 adapted to co-operate with a segmental rack 91 fixed at 92 on shaft 7. With this arrangement the two input torques originating from the windmill 8 and augmenter 79 are differentially summated and can result in a partial rotation of rack 91 and thence shaft 7.

The windmill 8 is adjusted so that when it rotates at a predetermined speed, the cage 37 does not move but if the windmill rotates at a higher or lower speed, cage 37 moves one way or the other thus causing a partial rotation of the segmental rack 91 and the shaft 7.

Fig. 4 shows details of a torque limiting slipping clutch which is interposed between the shaft 14 and gear 35 to prevent undue load being imposed on the differential gear mechanism 31. The windmill 8 being for practical purposes of fixed coarse pitch, it can be imagined that in some conditions it will be driven ("overdriven" as it were) through the differential gearing 31 by the augmenter 79. This produces, in effect, a reversal of its effective incidence and consequently of the direction of torque application. In other conditions the windmill 8 will be tending to drive the augmenter rotor 79. Extremes of these cases may be such as to give rise to unduly high stresses in the mechanism.

In order to prevent this a torque limiting slipping clutch is interposed between the shaft 14 and the gear wheel 35. This clutch comprises a driving plate 43 mounted on a shaft 40 which is rigid with shaft 47 and on which can rotate a bearing cone 46 and the spiral wheel 33 on the boss of which can rotate a friction plate 38. A spring 39 is interposed between the plate 38 and the plate 43, the members 38 and 43 being coupled by suitable dogs. The assembly is locked by means of nut 44, washer 45 and thrust washer 42 and the wheel 33 which is rigid with a bearing cone 35 can rotate by means of ball bearings 34 on a sleeve 41. With this arrangement, under normal running conditions wheel 33 rotates together with plate 38, cone 46, plate 43 and shaft 40, but when the torque transmitted by shaft 14 is too great, slipping takes place between the members 38 and 33, shaft 40 then becoming stationary and in this way preventing unduly high stresses from being produced in the differential mechanism 31.

Cooling means may be provided for the above described slipping clutch if desired.

The valve system denoted generally by reference numeral 9 in Fig. 1 is shown in greater detail in Fig. 5. The shaft 7 in the differential mechanism 31 of Fig. 3 is linked to a lever 85 pivoted at 86 to a link 51 which is in turn pivoted at 53 to a lever 52. The said lever 52 is pivoted at 57 to a link 58 and at 54 to a rod 55. The link 58 operates a servo valve while the rod 55 operates a spill or control valve. The latter is operated by means of a piston 59 adapted to slide in a chamber 60 provided in a casing 67 and thus to open or close ports 62, 63 provided in the chamber 66. The rod 55 is rigid with a piston 56 adapted to slide in a chamber 96 and to move against the resistance of a spring 57 in said chamber.

When ports 62 and 63 are open, fuel can flow from the pump 4 through pipe 6 and inlet 61 into port 62 into the chamber 66, thence through port 63 into a spill pipe 64 and back to the main fuel tank (not shown).

For operating the servo valve, the link 58 is connected to a piston 93 adapted to slide in a bore 94 provided in a casing 95. Servo liquid for operating the servo valve is led through a pipe 60 entering the bore 94 at aperture 89. This servo-liquid may be fuel taken from a branch pipe (not shown) off the main fuel supply for the prime mover. The part of bore 94 on the left hand side of piston 93 communicates with a drain 95 which in the case when fuel is used as a servo-liquid leads back to the fuel tank.

The chamber 96 can communicate through pipe 59 and port 90 with a part of bore 94 which may be either on the left hand or right hand side of piston 93 according to the position of said piston. In the position shown in Fig. 5 bore 94 is closed to pipe 59. If piston 93 moves to the left, chamber 96 is put into communication with pipe 60 and if piston 93 moves to the right, chamber 96 communicates with drain 95.

The operation of the valve system is as follows:

In the position shown in Fig. 5, piston 93 is in a neutral position so that port 90 is closed and there is no flow of servo-liquid. If shaft 7 now rotates clockwise, this rotates lever 85 similarly and pivot 53 moves to the right. Link 58 and rod 55 and piston 93 then all move to the right, thus uncovering port 90 in bore 94 and port 63 in chamber 66. Fuel then flows from the pipe 6 through pipe 61 and spill duct 64 to the main fuel tank (not shown) and at the same time servo-liquid flows from chamber 96 through pipe 59 and port 90 into the drain 95. The effect of the latter flow is to diminish the pressure of the servo liquid on the left hand side of piston 56 thus causing it to be moved back to an equilibrium position under the action of spring 57. The servo valve thus acts as a follow up mechanism for the control or spill valve.

If the shaft 7 rotates anti-clockwise, then the reverse operations to those described above will occur.

Assuming the whole system hereinabove described to be operating, and the secondary fuel supply to be delivered by pump 4 through pipe 6, the apparatus functions as follows. If the velocity of the secondary air stream X is such as to drive the windmill 8 and thus the differential gear 30 at the correctly equivalent speed to that of the augmenter 79 (as determined by design considerations) matters are so arranged that an effort is exerted on the differential cage 37 and thence shaft 7 and rod 55 opposing the spring 57 so as to keep the secondary fuel control valve exactly sufficiently open. Now if the velocity of the secondary air stream X decreases (for example due to the aircraft climbing) then the speed of rotation of windmill 8 will decrease and cage 37 and rack 91 will consequently perform a partial rotation thus rotating shaft 7 clockwise to increase the spill and so to reduce the supply of fuel to the burner 105. When new equilibrium conditions are established, the windmill 8 settles down to a new speed. Similarly if the speed of the compressor 1 and turbine 2 be changed (e. g. by the pilot's control) the speed of the augmenter rotor 79 will change correspondingly (other factors remaining constant) and this will have its corresponding effect on shaft 14 and thence shaft 7 and the secondary fuel spill.

Where the propulsive system has a ducted air screw or the equivalent driven positively by the prime mover, the second transmitter to the differential gear 31 may be a rotor of the prime mover.

The angle at which the secondary air stream X attacks the blades of the windmill 8 can be varied when desired by means of the arrangement shown in Figs. 6 to 8 and denoted generally by reference numeral 48 in Fig. 1. This apparatus comprises three co-axial rings 3, 5 and 106 of which ring 3 is fixed and rings 5 and 106 move together and can be given a small rotation in either direction by means of a rack 49, the teeth 69 of which co-operate with the teeth 68 of a pinion 67 so that rotation of said pinion 67 e. g. by an external control lever (not shown) causes a rotation of rack 49 and thence of the movable ring 5.

A series of stator blades or guide vanes 97 are provided, each blade being supported by a movable pin 13 located at approximately the centre of the blade and by a fixed nib 98 integral with the blade and about which each blade can pivot. Fig. 8 shows the positions which a blade can occupy when ring 5 is moved in one or other direction. If P represents an original position of pin 13 and Q an original position of nib 98, then the axis of the blade 97 is along the line PQ. If ring 5 is rotated upwards in Fig. 8 then P moves to $P^1$ and the axis of the blade 97 is then altered to $P^1Q$. If ring 5 is moved in the opposite direction, i. e. downwards in Fig. 8 then the pin 13 moves to a new position $P^2$ and the new axis of the blade $P^2Q$. The alteration in the direction of the blade axis adjusts the angle of attack of the secondary air stream X on to the blades of the windmill 8.

The two pins 12 are lengthened to go through the outer casing 75 and carry the rack 49 which is limited to move between limiting positions defined by a slot EF in casing 75.

Fig. 9 illustrates diagrammatically a second form of embodiment in which the cage 20 of a differential gear is made fully rotatable and represents the resultant output torque of which the components are the torques imparted by shafts 70 and 14 both rotating in the same direction.

A windmill 8 is mounted on shaft 21 provided with a pinion 22 meshing with gear wheel 69 on shaft 70 on which is mounted pinion 71. Shaft 14 is again coupled to the augmentor rotor (not shown) and drives pinion 74 meshing with gear wheel 76 which rotates with the toothed annulus 72. Pinion 88 meshes with pinion 71 and with the toothed annulus 72 and cage 20 is coupled on the one hand to pinion 88 and on the other to shaft 77 of gear pump 4 which delivers the secondary fuel.

In this case the shaft 70 exerts a very small torque and the shaft 14 a very much larger one, the total torque then being transmitted to shaft 77 the speed of rotation of which determines the rate at which fuel is delivered to the burner 105 for the secondary fuel.

In this case the differential valve mechanism 9 is dispensed with, the pump 4 delivering directly to the burner 105. The apparatus 48 for varying the angle of attack of the secondary air stream on the blades of the windmill 8 may again be employed.

A fuel control to meet all the characteristics of some augmentors with secondary combustion systems requires account to be taken of a number of factors. In essence, what is necessary is to keep the velocity diagram pertaining to the first stage of the blades of the augmenter the correct shape and this is determined by the ratio of axial velocity to the blade speed. It is easy to advise a mechanism which is sensitive to blade speed as it may be merely a mechanical connection to the shaft but the device which is sensitive to axial velocity must be insensitive to altitude and temperature and therefore to density. It is for this reason that the windmill 8 above mentioned, which can be generalised as an anemometer or rotary log type of device, is proposed to be used. It is preferable that this device should not be required to do any substantial work consequently the differential mechanism 31 is proposed to be mounted on ball bearings and made as small as possible.

Owing to the narrow range over which augmenters may be effective, extreme sensitivity of secondary fuel control is most desirable. The sharply falling characteristic of the augmenter if insufficient fuel is given to the associated combustion system, will lead to much reduced pressure and consequently reduction of jet reaction; the reduction of flow tends to approach the surge point of the augmenter.

I claim:

1. A jet propulsion system for aircraft comprising a compressor for delivering a main fluid stream, a gas turbine for driving said compressor, a main combustion system for receiving said main fluid stream for burning fuel therein to heat energize it to provide hot working fluid for said turbine, a main fuel supply and control system for supplying and controlling the flow of fuel to said main combustion system, a duct system extending from said turbine with a jet outlet at its end for discharging said turbine working fluid exhausted by said turbine to atmosphere as a main propulsive jet, a second duct system for passing a second fluid stream, a second compressor in said second duct system having a bladed impeller rotatable for inducing said second fluid stream to augment said main propulsive jet stream, means for driving said second compressor impeller at any speed within its working range for inducing said second fluid stream to flow, a second combustion system in said second duct system downstream of said second compressor impeller for burning fuel therein to heat energize said second fluid stream, a second fuel supply and control system for supplying fuel to said second combustion system having a fuel supply control means for varying the quantity of said second fuel supply to said second combustion chamber, and a ratio determining and second fuel supply control actuating means arranged in association with said second compressor impeller and second compressor impeller driving means for giving a measure of a quantity that is a function of the blade speed of said second compressor impeller and for giving a measure of the actual velocity of said second fluid stream at a definite region of said second duct system and for determining the ratio of said measures and for actuating said second fuel supply control means in dependence on said ratio; said ratio determining and fuel supply control actuating means and said second fuel supply control means cooperating together and acting in the sense of maintaining said ratio at a prescribed value for any value of the rotational speed within the working range of said second compressor impeller.

2. A jet propulsion system for aircraft comprising a compressor for delivering a main fluid stream a gas turbine for driving said compressor, a main combustion system for receiving said main fluid stream for burning fuel therein to heat energize it to provide hot working fluid for said turbine, a main fuel supply and control system for supplying and controlling the flow of fuel to said main combustion system, a duct system extending from said turbine with a jet outlet at its end for discharging said turbine working fluid exhausted by said turbine to atmosphere as a main propulsive jet, a second duct system for passing a second fluid stream, a second compressor in said second duct system having a bladed impeller rotatable for inducing said second fluid stream to augment said main propulsive jet stream, means for driving said second compressor impeller at any speed within its working range for inducing said second fluid stream to flow, a second combustion system in said second duct system downstream of said second compressor impeller for burning fuel therein to heat energize said second fluid stream, a second fuel supply and control system for supplying fuel to said second combustion system having a fuel supply control means for varying the quantity of said second fuel supply to said second combustion chamber, and a ratio determining and second fuel supply control actuating means arranged in association with said second compressor impeller and second compressor impeller driving means for giving a measure of the rotational speed of said second compressor impeller and giving a measure of the actual velocity of said second fluid stream at a definite region of said second duct system and for determining the ratio of said measures and for actuating said second fluid supply control means in dependence on said ratio; said ratio determining and fuel supply control actuating means cooperating together and acting in the sense of maintaining said ratio at a prescribed value for any value of the rotational speed within the working range of said second compressor impeller.

3. A jet propulsion system for aircraft comprising a compressor for delivering a main fluid stream, a gas turbine for driving said compressor, a main combustion system for receiving said main fluid stream for burning fuel therein to heat energize it to provide hot working fluid for said turbine, a main fuel supply and control system for supplying and controlling the flow of fuel to said main combustion system, a duct system extending from said turbine with a jet outlet at its end for discharging said turbine working fluid exhausted by said turbine to atmosphere as a main propulsive jet, a second duct system for passing a second fluid stream, a second compressor in said second duct system having a bladed impeller rotatable for inducing said second fluid stream to augment said main propulsive jet stream, means for driving said second compressor impeller at any speed within its working range for inducing said second fluid stream to flow, a second combustion system in said second duct system downstream of said second compressor impeller for burning fuel therein to heat energize said second fluid stream, a second fuel supply and control system for supplying fuel to said second combustion system having a fuel supply control means for varying the quantity of said second fuel supply to said second combustion chamber, and a ratio determining and fuel supply control actuating means arranged in association with said second compressor impeller and second compressor impeller rotating means comprising means for giving a measure of the rotational speed of said second compressor impeller, means for giving a measure of the actual velocity of said second fluid stream induced by said second impeller at a definite region of said second duct system and means for receiving said measures and determining the ratio thereof and actuating said second fuel supply control means in dependence thereon; said rotational speed measuring means, said actual fluid velocity measuring means, said ratio determining means and said second fuel supply control means co-operating together and acting in the sense of maintaining said ratio at a prescribed value for any value of the rotational speed within the working range of said second compressor impeller.

4. A jet propulsion system for aircraft comprising a compressor for delivering a main fluid stream, a gas turbine for driving said compressor, a main combustion system for receiving said main fluid stream for burning fuel therein to heat energize it to provide hot working fluid for said turbine, a main fuel supply and control system for supplying and controlling the flow of fuel to said main combustion system, a duct system extending from said turbine with a jet outlet at its end for discharging said turbine working fluid exhausted by said turbine to atmosphere as a main propulsive jet, a second duct system for passing a second fluid stream, a second compressor in said second duct system having a bladed impeller rotatable for inducing said second fluid stream to augment said main propulsive jet stream, means for driving said second compressor impeller at any speed within its working range for inducing said second fluid stream to flow, a second combustion system in said second duct system downstream of said second compressor impeller for burning fuel therein to heat energize said second fluid stream, a second fuel supply and control system for supplying fuel to said second combustion system having a fuel supply control means for varying the quantity of said second fuel supply to said second combustion chamber, and ratio determining and second fuel supply control actuating means arranged in association with said second compressor impeller and second compressor impeller rotating means comprising a speed mechanism driven by said second compressor impeller for giving rotations to a shaft proportional to the rotational speed of said impeller, a windmill anemometer mechanism mounted in the second fluid stream duct at a definite region of said system for giving a measure of the actual velocity of said second fluid stream by the rotation of a shaft, and a differential mechanism, the two input shafts of which are connected respectively to the speed mechanism shaft and the windmill anemometer mechanism shaft and the cage of said differential mechanism, which is rotatable by said input shafts, being capable of giving a movement which is the ratio of the rotational speed of said second compressor impeller and said actual velocity of said second fluid stream is connected to said second fuel supply control means to actuate it in dependence on said ratio; said speed mechanism, said windmill anemometer mechanism, said differential mechanism and said second fuel supply control means co-operating together and acting in the sense of maintaining said ratio at a prescribed value for any value of the rotational speed within the working range of said second compressor impeller.

5. A jet propulsion system for aircraft comprising a main compressor for delivering a main fluid stream, a main gas turbine for driving said main compressor, a main combustion system for receiving said main fluid stream for burning fuel therein to heat energize it to provide hot working fluid for said main turbine, a main fuel supply and control system for supplying and controlling the fuel flow to said main combustion system, a main duct system extending from said main turbine with a jet outlet at its end for discharging said turbine working fluid exhausted by said turbine to atmosphere as a main propulsive jet, a second duct system for passing a second fluid stream, a second compressor in said duct system having a bladed impeller rotatable for inducing said second fluid stream to augment said main propulsive jet stream, a second turbine for driving said second compressor impeller at any speed within its working range for inducing said second fluid stream to flow arranged in association with said main duct system to receive therefrom exhaust working fluid from said main turbine, a second combustion system in said second duct system downstream of said second compressor impeller for burning fuel therein to heat energize said second fluid stream, a second fuel supply and control system for supplying fuel to said second combustion system having a fuel valve for varying the quantity of fuel to said second combustion chamber, a ratio determining and second fuel valve actuating means arranged in association with said second compressor impeller and second turbine comprising a speed mechanism driven by said second turbine for giving rotations to a shaft proportional to the rotational speed of said second compressor impeller, a windmill anemometer mechanism mounted in said second fluid duct at a definite region of said system for giving a measure of the actual velocity of said second fluid stream by the rotation of a shaft and differential mechanism, the two input shafts of which are connected respectively to said speed mechanism shaft and said windmill anemometer mechanism shaft and the cage of which differential mechanism being rotatable by said input shafts and being capable of giving a movement which is the ratio of the rotational speed of said second compressor impeller and said actual velocity of said second fluid stream is connected to said fuel valve to actuate it in dependence on said ratio; said speed mechanism, said windmill anemometer mechanism, said differential mechanism and said fuel valve co-operating together and acting in the sense of maintaining said ratio at a prescribed value for any value of the rotational speed within the working range of said second compressor impeller.

6. A jet propulsive system for aircraft comprising a main compressor for delivering a main fluid stream, a main gas turbine for driving said main compressor, a main combustion system for receiving said main fluid stream for burning fuel therein to heat energize it to provide hot working fluid to said main turbine, a main fuel supply and control system for supplying and controlling the fuel flow to said main combustion system, a main duct system extending from said main turbine with a jet outlet at its end for discharging said working fluid exhausted by said main turbine to atmosphere as a main propulsive jet, a second duct system for passing a second fluid stream annularly arranged around said main duct system, a second compressor in said second annular duct system having a bladed impeller with blades arranged in said annular duct for inducing said second fluid stream to augment said main propulsive jet stream, a second turbine for driving said second compressor at any speed within its working range arranged in said main duct system downstream of said main turbine having a bladed rotor with the blades arranged in the main duct and driven by the exhaust working fluid of said main turbine, said turbine rotor and said second compressor forming a composite unit with the second turbine rotor concentrically arranged within the second compressor impeller, a second combustion system in said second duct system downstream of said second compressor impeller for burning fuel therein to heat energize said second fluid stream, a second fuel supply and control system for supplying fuel to said second combustion system having a fuel valve for varying the quantity of fuel to said second combustion chamber, a ratio determining and second fuel valve actuating means arranged in association with said second compressor impeller and turbine comprising a speed mechanism driven by said second turbine for giving rotations of a shaft proportional to the rotational speed of said second compressor impeller, a windmill anemometer mechanism having a fixed pitch windmill mounted in said second fluid duct upstream of said second compressor impeller for giving a measure of the actual velocity of said second fluid stream by the rotation of a shaft and having stator blades arranged upstream of said windmill capable of being moved to vary the angle of attack of said second fluid stream on said windmill and differential mechanism, the two input shafts of which and connected respectively to said speed mechanism shaft and said windmill shaft and the cage of which differential mechanism being rotatable by said input shafts and being capable of giving a movement which is the ratio of the rotational speed of said second compressor impeller and said actual velocity of said second fluid stream is connected to said fuel valve to actuate it in dependence on said ratio; said speed mechanism, said windmill anemometer mechanism, said differential mechanism and said fuel valve co-operating together and acting in the sense of maintaining said ratio at a prescribed value for any value of the rotational speed within the working range of said second compessor impeller.

7. In an elastic-fluid flow system which includes fluid flow ducting, a rotary bladed impeller of a compressor connected in said system for acting on said fluid, gas turbine driving means for rotating said impeller at variable speed for inducing flow of a stream of fluid through said ducting, and means additional to said impeller in said system for varying the mass flow of fluid therethrough; the provision of control means therefor responsive to the ratio of the blade speed of said impeller to the actual velocity of said fluid at a region in said system where said velocity is a measure of the actual fluid velocity at a region within said compressor, said ratio-responsive control means being operatively connected to said mass-flow-varying means to act thereon in the sense of maintaining said ratio at a prescribed value for any value of the rotational speed within the working range of the said impeller.

8. In an elastic-fluid flow system which includes fluid flow ducting, a rotary bladed impeller of a compressor connected in said system for acting on said fluid, gas turbine driving means for rotating said impeller at variable speed for inducing flow of a stream of said fluid through said ducting, combustion means for continuously burning fuel in said fluid stream downstream of said impeller, and means for controlling the flow of fuel to said combustion means; the provision of means responsive to the ratio of the rotational speed of said impeller to the actual velocity of said fluid induced by said impeller at some region in said compressor, said ratio-responsive means being operatively connected to said fuel-controlling means to act thereon in the sense of maintaining said ratio at a prescribed value for any value of the rotational speed within the working range of said impeller.

9. In an elastic-fluid flow system which includes fluid flow ducting, a rotary bladed impeller of a compressor connected in said system for acting on said fluid, gas turbine driving means for rotating said impeller at variable speed for inducing flow of a stream of fluid through said ducting, combustion means for continuously burning fuel in said fluid stream downstream of said impeller, and means for controlling the flow of fuel to said combustion means; the provision of a first control element in driving connection with said impeller for rotation at a speed directly proportional to the rotational speed of said impeller, and a second control element giving a measure of the actual velocity of said fluid at a region within said compressor, the means for varying the flow of fuel being under the joint control of said first and second control elements in the sense of maintaining the ratio of said actual fluid velocity to said rotational speed at the prescribed value for any value of the rotational speed within the working range of said impeller.

10. In an elastic-fluid flow system which includes fluid flow ducting, a rotary bladed impeller of a compressor of the dynamic type connected in said system for acting on said fluid, means for rotating said impeller at any speed within its working range for inducing a flow of fluid through said ducting, additional means to said impeller in said system for varying the mass flow of fluid flowing therethrough and control means for controllably varying said additional means for effecting variations in said fluid flow; the provision of ratio determining and control actuating means arranged in association with said impeller and impeller rotating means comprising a speed mechanism driven by said impeller for giving rotations to a shaft proportional to the rotational speed of said impeller, a windmill anemometer mechanism mounted in the fluid flow ducting at a definite region of said system for giving a measure of the actual velocity of said fluid by the rotation of a shaft, and a differential mechanism, the two input shafts of of which are connected respectively to the speed mechanism shaft and the windmill anemometer mechanism shaft and the cage of said differential mechanism which is rotatable by said input shafts being capable of giving a movement which is the ratio of the rotational speed of said compressor impeller and the actual velocity of the fluid is connected to said control means to actuate it in dependence on said ratio; said speed mechanism, windmill anemometer mechanism, differential mechanism and said control means co-operating together and acting in the sense of maintaining said ratio at a prescribed value for any value of the rotational speed within the working range of said impeller.

11. In an elastic-fluid flow system which includes fluid flow ducting, a rotary bladed impeller of a compressor of the dynamic type connected in said system for acting on said fluid, means for rotating said impeller at any speed within the working range for inducing a flow of fluid through said ducting, combustion means in said ducting of said system downstream of said impeller for burning fuel and heat energizing said fluid, a fuel system for supplying fuel to said combustion system with fuel control means for varying the quantity of fuel supplied to said combustion means and hence varying the back pressure in said ducting; the provision of ratio determining and fuel control actuating means arranged in association with said impeller and impeller rotating means, comprising a speed mechanism driven by said impeller for giving rotations to a shaft proportional to the rotations thereof, a windmill anemometer mechanism mounted in the fluid flow ducting at a definite region of said system for giving a measure of the actual velocity of said fluid by the rotation of a shaft, and a differential mechanism, the two input shafts of which are connected respectively to the speed mechanism shaft and the windmill anemometer mechanism shaft and the cage of said differential mechanism which is rotatable by said input shafts being capable of giving a movement which is the ratio of the rotational speed of said compressor impeller and the actual velocity of the fluid is connected to said fuel control means to actuate it in dependence on said ratio; said speed mechanism, said windmill anemometer mechanism, said differential mechanism and said fuel control means co-operating together and acting in the sense of maintaining said ratio at a prescribed value for any value of the rotational speed within the working range of said impeller.

References Cited in the file of this patent

UNITED STATES PATENTS

| Number | Name | Date |
|---|---|---|
| Re. 23,198 | Anxionnaz | Feb. 21, 1950 |
| 1,017,509 | Callan | Feb. 13, 1912 |
| 1,465,091 | Prince | Aug. 14, 1923 |
| 1,815,097 | Davidson | July 21, 1931 |
| 1,919,126 | Perkins | July 18, 1933 |
| 1,967,449 | Ostman | July 24, 1934 |
| 2,193,114 | Seippel | Mar. 12, 1940 |
| 2,378,037 | Reggio | June 12, 1945 |
| 2,382,707 | Gosslau | Aug. 14, 1945 |
| 2,410,773 | Chandler | Nov. 5, 1946 |
| 2,441,948 | Atkinson | May 25, 1948 |
| 2,447,262 | Mock | Aug. 17, 1948 |
| 2,447,267 | Mock | Aug. 17, 1948 |
| 2,503,006 | Stalker | Apr. 4, 1950 |
| 2,505,660 | Bauman | Apr. 25, 1950 |
| 2,514,513 | Price | July 11, 1950 |
| 2,537,772 | Lundquist | Jan. 9, 1951 |

FOREIGN PATENTS

| Number | Country | Date |
|---|---|---|
| 587,558 | Great Britain | May 7, 1947 |